United States Patent [19]

Michel

[11] Patent Number: 4,904,719

[45] Date of Patent: Feb. 27, 1990

[54] NONCORROSIVE, AQUEOUS ORGANOPOLYSILOXANE EMULSIONS

[75] Inventor: Ulrich Michel, Burghausen, Fed. Rep. of Germany

[73] Assignee: Wacker-Chemie GmbH, Munich, Fed. Rep. of Germany

[21] Appl. No.: 230,731

[22] Filed: Aug. 8, 1988

Related U.S. Application Data

[63] Continuation-in-part of Ser. No. 142,607, Jan. 11, 1988, abandoned.

[30] Foreign Application Priority Data

Jan. 15, 1987 [DE] Fed. Rep. of Germany ....... 3700972

[51] Int. Cl.$^4$ .................................................. C08K 5/04
[52] U.S. Cl. ........................................ 524/238; 524/239; 524/240; 524/724; 524/714
[58] Field of Search .............. 524/238, 239, 240, 724, 524/714

[56] References Cited

U.S. PATENT DOCUMENTS

| | | | |
|---|---|---|---|
| 4,404,109 | 9/1983 | Tellier et al. | 260/404 |
| 4,525,502 | 6/1985 | Traver | 524/238 |
| 4,590,220 | 5/1986 | Bauman et al. | 524/425 |

Primary Examiner—Melvyn I. Marquis

[57] ABSTRACT

The invention relates to noncorrosive, aqueous emulsions containing an organopolysiloxane and an emulsifier selected from a compound of the general formula

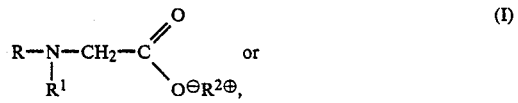
(I)

a compound of the formula

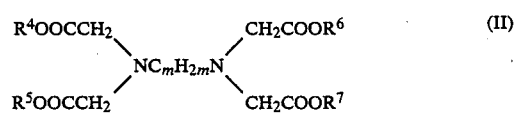
(II)

or mixtures thereof in which R is an aliphatic, saturated or unsaturated alkylcarbonyl radical of a carboxylic acid having from 5 to 30 carbon atoms or a saturated or unsaturated alkylphenylcarbonyl radical, where the alkyl group has from 2 to 20 carbon atoms, $R^1$ is a hydrogen or a methyl radical, $R^{2\oplus}$ is an alkali metal cation or an ammonium ion of the general formula

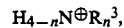

where $R^3$, which is the same or different, is an hydroxylated alkyl radical having from 1 to 20 carbon atoms or a radical of the general formula $-(C_yH_{2y}O)_xH$, where x is an integer of from 1 to 10, y is 2 or 3 and n may be 0, 1, 2 or 3, $R^4$ is an alkali metal or alkaline-earth metal cation which forms a salt with the carboxyl group, $R^5$ may be an aliphatic, saturated or unsaturated alkyl radical having from 5 to 30 carbon atoms or an alkylphenyl radical, where the alkyl group has from 5 to 30 carbon atoms, $R^6$ and $R^7$, which may be the same or different is an alkali metal or alkaline-earth metal cation, which forms a salt with the carboxyl group or an aliphatic, saturated or unsaturated alkyl radical having from 5 to 30 carbon atoms or an alkylphenyl radical, where the alkyl group has from 5 to 30 carbon atoms, and m is an integer of from 2 to 12.

1 Claim, No Drawings

NONCORROSIVE, AQUEOUS ORGANOPOLYSILOXANE EMULSIONS

This application is a continuation-in-part application of application Ser. No. 142,607, filed on Jan. 11, 1988, now abandoned.

The present invention relates to organopolysiloxane emulsions and more particularly to noncorrosive aqueous organopolysiloxane emulsions.

BACKGROUND OF THE INVENTION

Aqueous organopolysiloxane emulsions have been used heretofore as release agents, as lubricants, or for rendering organic and mineral substrates hydrophobic and as textile finishing agents. In these applications, the aqueous emulsions are in contact with iron or nonferrous heavy metals which are susceptible to corrosion.

It is known that sodium nitrite, organic amines or inhibitors based on sodium benzoates can be added to aqueous organopolysiloxane emulsions to reduce corrosion. When sodium nitrite is added to the aqueous organopolysiloxane emulsions, nitrosamines often form on addition of tertiary amines. This frequently occurs because the polysiloxane emulsions are often combined with other aqueous compositions. Moreover, the addition of organic amines or salts of benzoic acid and derivatives thereof often contributes to the destabilization of the composition, and thereby reduces the effectiveness of the composition after application. Furthermore, organic amines form colored complexes with many metal ions, thereby making the compositions less desirable because of their optical appearance.

Therefore, it is an object of the present invention to provide aqueous organopolysiloxane emulsions which are noncorrosive. Another object of the present invention is to provide aqueous organopolysiloxane emulsions which do not form nitrosamines. Still another object of the present invention is to provide aqueous organopolysiloxane emulsions which have better stability. A further object of the present invention is to provide aqueous organopolysiloxane emulsions which do not interfere with the application. A still further object of the present invention is to provide an aqueous organopolysiloxane emulsion which does not discolor in the presence of metal ions and accordingly provide emulsions having a desirable optical appearance.

SUMMARY OF THE INVENTION

The foregoing objects and others which will become apparent from the following description are accomplished in accordance with this invention, generally speaking, by providing a noncorrosive, aqueous emulsion containing an organopolysiloxane and an emulsifier consisting of a compound of the general formula

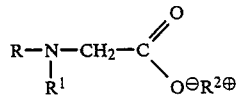

where R is an aliphatic, saturated or unsaturated alkyl carbonyl radical of a carboxylic acid having from 5 to 30 carbon atoms or a saturated or unsaturated alkylphenyl carbonyl radical, where the alkyl group has from 2 to 20 carbon atoms, $R^1$ is hydrogen or a methyl radical, $R^{2\oplus}$ is an alkali metal cation or an ammonium ion of the general formula

where $R^3$, which is the same or different, is an hydroxylated alkyl radical having from 1 to 20 carbon atoms or a radical of the general formula $-(C_yH_{2y}O)_xH$, where x is an integer of from 1 to 10, y is 2 or 3 and n may be 0, 1, 2 or 3, and/or a compound of the formula

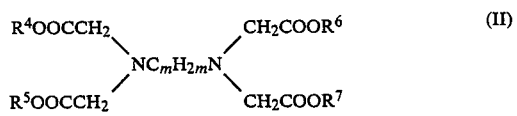

where $R^4$ is an alkali metal or alkaline-earth metal cation which forms a salt with the carboxyl group, $R^5$ is an aliphatic, saturated or unsaturated alkyl radical having from 5 to 30 carbon atoms or an alkylphenyl radical, where the alkyl group has from 5 to 30 carbon atoms, $R^6$ and $R^7$, which may be the same or different is an alkali metal or alkaline-earth metal cation, which may form a salt with a carboxyl group or an aliphatic, saturated or unsaturated alkyl radical having from 5 to 30 carbon atoms or an alkylphenyl radical where the alkyl group has from 5 to 30 carbon atoms, and m is an integer of from 2 to 12.

DESCRIPTION OF THE INVENTION

The noncorrosive emulsions of this invention contain an organopolysiloxane and an emulsifier.

Examples of carboxylic acids having from 5 to 30 carbon atoms which form the R radicals in the emulsifiers of the present invention are octanoic acid, caprylic acid, decanoic acid, undecanoic acid, lauric acid, tetradecanoic and myristic acid, hexadecanoic acid, palmitic acid, octadecanoic acid, as well as stearic acid, octadecenic acid, oleic acid, cis-9, cis-12-octadecadienic acid, linoleic acid, cis-9, cis-12, cis-15-octadecatrienic acid, linoleic acid, the cis-9, trans-11, trans-13-octadecatrienic acid, eleostearic acid, 12-hydroxycis-9-octadecenic acid, the ricinoleic acid, arachidic acid, the docosanoic acid, behenic acid and lignocerinic acid.

Additional examples of carboxylic acids which generate the R radicals are synthetically produced carboxylic acids comprising an even or an odd number of carbon atoms, such as n-nonanoic, i-nonanoic, n-dodecanoic, i-dodecanoic, n-tridecanoic and i-tridecanoic acid.

It is, of course, possible to use as emulsifiers mixtures of compounds corresponding to formula I. For example, such mixtures result when naturally occurring fatty acid mixtures are used as starting products for the R radicals.

Examples of such naturally produced mixtures are known under the following designations: Coconut fatty acid containing 44–55 percent lauric acid, 13–18 myristic acid, 9–10 percent palmitic acid, 6–9 percent caprylic acid, 6–10 percent capric acid, 5–8 percent oleic acid, 1–3 percent stearic acid, 0–2 percent linoleic acid and 0–1 percent caproic acid; tallow fatty acid containing from 1–6 percent myristic acid, 30–37 percent palmitic acid, 6–40 percent stearic acid, 20–50 percent oleic acid and 0–5 percent linoleic acid, 1–9 palmitoleic acid, 0–3 percent linolenic acid; and soybean oil fatty acid comprising 7–12 percent palmitic acid, 2–3 percent stearic acid, 20–30 percent oleic acid, 48–58 percent linoleic acid, 4–10 percent linolenic acid and 0–3 percent arachidic acid.

All percentages are by weight based on the total weight of the composition.

Examples of $R^{2\oplus}$ are $Na^\oplus$, $K^\oplus$ and $NH_4^\oplus$. Examples of $R^3$ radicals are methyl, ethyl, n-propyl and isopropyl radicals, as well as the $CH_2CH_2OH$, $CH_2CH(OH)CH_3$ and $CH_2CH_2CH_2OH$ radicals. Examples of $R^4$ are $Na^\oplus$ and $K^\oplus$. Examples of $R^5$ radicals are dodecyl and lauryl radicals, the cis-9-octadecyl radical and the oleyl radical, the octadecyl, stearyl, hexadecyl and palmityl radicals, tetradecyl, myristyl and isotridecyl radicals, as well as mixtures of alkyl radicals and the alcohols which are obtained when the above mentioned fatty acids such as coconut fatty acid, tallow fatty acid and soybean fatty acid are reduced to their corresponding alcohols. The examples cited with respect to $R^4$ and $R^5$ radicals are equally applicable to the $R^6$ and $R^7$ radicals.

It is preferred that as far as the alkylcarbonyl, alkyl and alkylphenyl radicals are concerned, the R radicals have from 12 to 18 carbon atoms and that in the case of alkylphenylcarbonyl radicals, the alkyl radicals have a chain length of from 4 to 12 carbon atoms.

It is preferred that emulsifiers with potassium or sodium cations be used, as well as monoethanolammonium cations or triethanolammonium cations.

The emulsifiers used in accordance with this invention may be used alone, mixed with each other, or mixed with other nonionic surfactants, such as polyethylene glycol ethers of alkanols, for example, dodecanolpolyethylene glycol (10) ether, isotridecanol polyethylene glycol (15) ether, dodecanol polyethylene glycol (12) ether, trimethylnonanol polyethylene glycol (10) ether or polyethylene glycol ethers of alkylphenols, such as for example, isooctylphenol polyethylene glycol (10) ether, isononylphenyl polyethylene glycol (10) ether or anionic surfactants such as alkylsulfates and alkylsulfonates, in which the alkyl radical may have from 12 to 18 carbon atoms, for example, dodecylsulfate, dodecylsulfonate or so-called alkylether sulfates, such as sodium dodecanol triethylene glycol sulfate.

The emulsions of this invention preferably contain organopolysiloxanes having terminal silicon bonded hydroxyl groups, or trimethylsilyl groups and silicon bonded alkyl groups having from 1 to 20 carbon atoms, phenyl groups, alkylphenyl groups, aminoalkyl groups such as the 3-aminopropyl group or the N-aminoethyl-3-aminopropyl group and/or epoxy containing radicals, such as the glycidether radical or polyglycol ether or polyethylene glycols as well as polypropylene glycol or copolyethers thereof.

The organopolysiloxanes may also be low-molecular weight copolymers or resin type polymers which contain structural units of the formula $RSiO'_{3/2}$ or $SiO_{4/2}$ where R may be an alkyl group having from 1 to 20 carbon atoms, such as the methyl radical, a vinyl radical or a phenyl radical.

The organopolysiloxanes used in these emulsions are commercially available or are readily prepared by known processes. W. Noll, Chemistry and Technology of Silicones, Academic Press Inc., Orlando, 1968 describes processes for preparing organopolysiloxanes which may be used in the emulsions of this invention.

In a preferred embodiment of this invention, 100 parts by weight of organopolysiloxane are emulsified in a high velocity dispersion apparatus with from 5 to 35 parts by weight and more preferably from 10 to 18 parts by weight of an emulsifier of which between 5 and 100 parts by weight and more preferably 10 to 20 parts by weight consist of emulsifiers prepared in accordance with this invention, and from 50 to 900 parts by weight and more preferably 100 to 150 parts by weight of water.

The dispersion apparatus, used in the process of this invention are preferably those of the rotor-stator machine type, colloid mills or blade agitators, as well as high pressure homogenizers or ultrasound homogenizers.

The organopolysiloxane emulsions prepared in accordance with this invention are preferably employed where, corrosion is likely to occur in the presence of aqueous compositions. The may be used, for example, as lubricants or as release agents in the presence of water in offset printing, or in formulations which are dispensed from metallic aerosol containers or as a compound of aqueous based polishes.

COMPARISON EXAMPLES 1 TO 3

About 350 parts by weight of dimethylpolysiloxane having terminal trimethylsilyl groups and a viscosity of 1000 mm$^2$/sec at 25° C. were mixed and homogenized with 40 parts by weight of the emulsifiers listed in Table 1. The mixture was subsequently diluted with the amount of water necessary to attain a total of 1000 parts by weight. The resultant emulsions were poured into an open beaker containing two polished 1×1 cm pieces of copper and black iron plate. The appearance of these pieces of metal and the emulsions were observed after the periods of time specified in the table.

TABLE 1

| Example Number | Emulsifier | Additional components/quantities | Appearance of metal disks after (days) | | | Appearance of emulsion after (days) | | |
|---|---|---|---|---|---|---|---|---|
| | | | 1 | 7 | 21 | 1 | 7 | 21 |
| 1 | Cocoalkanol polyethyleneglycol (10) ether | — | Cu +<br>Fe − | −<br>− | −<br>− | Brown<br>Milky with flakes | | |
| 2 | Cocoalkanol polyethyleneglycol (10) ether | Monoethanolamine 5 parts | Cu + | + | + | +Blue | | |
| 3 | Cocoalkanol polyethyleneglycol (10) ether | Sodium benzoate 3 parts | Cu +<br>Fe + | +<br>+ | +<br>+ | +<br>+ | +<br>+ | +<br>+ |

+ represents unchanged condition.
− indicates corrosion.

Cocoalkanol is a mixture of the following alkanols:
44–51 percent dodecanol
13–18 percent tetradecanol
8–10 percent hexadecanol
6–9 percent octanol
6–10 percent decanol
5–8 percent cis-9-octadecenol
1–3 percent octadecanol
0–2 percent cis-9, cis-12-octadecadienic acid, with the proviso that within the parameters indicated above, the composition may vary, according to the origin of the material.

EXAMPLES 4 TO 12

The procedure of Comparison Example 1 was repeated, except that the amounts of emulsifiers listed in Table 2 were substituted for the emulsifiers of Table 1. No corrosion or changes were observed after 21 days using the test method described in Comparison Examples 1 to 3.

TABLE 2

| Example Number | Emulsifier Amount | Emulsifier Type | Metal Plate |
|---|---|---|---|
| 4 | 40 parts | Na salt of N—oleoylsarcosine | Cu Fe |
| 5 | 40 parts | Triethanol ammonium salt N—oleoylsarcosine | Cu Fe |
| 6 | 20 parts | Cocosalkyl polyethylene glycol (10) ether | Cu |
|   | 20 parts | Triethanol ammonium salt N—oleoylsarcosine | Fe |
| 7 | 40 parts | Triethanol ammonium salt N—lauroylsarcosine | Cu Fe |
| 8 | 40 parts | Triethanol ammonium salt N—cocoylsarcosine | Cu Fe |
| 9 | 20 parts | Triethanol ammonium salt N—cocoylsarcosine | Cu |
|   | 20 parts | N—dodecylbenzolesulfonate | Fe |
| 10 | 30 parts | Cocosalkyl polyethylene glycol (10) ether | Fe |
|    | 10 parts | Mono/di $C_{13}$alkanolester of EDTA*-(triethanol ammonium salt) | Fe |
| 11 | 27 parts | Cocosalkyl polyethylene glycol (10) ether | Cu |
|    | 3 parts | Ammonium salt N—lauroylsarcosine | Fe |
| 12 | 27 parts | Cocosalkyl polyethylene glycol (10) ether | Cu |
|    | 3 parts | Triethanol ammonium salt N—lauroylsarcosine | Fe |

*EDTA corresponds to ethylenediaminetetracetic acid and in the aforementioned mixture of alkylcarbonyl groups, the cocoyl group corresponds to the coconut fatty acid.

EXAMPLE 13

About 350 parts by weight of a cohydrolysate prepared from 80 parts by weight of dimethyldichlorosilane and 20 parts by weight of methyltrichlorosilane, are mixed with 20 parts by weight of a triethanolammonium salt of N-cocoylsarcosine (cocoyl group corresponds to the coconut fatty acid), and then 40 parts by weight of water. The resultant mixture is homogenized and then diluted with enough water to attain 1000 parts by weight. No corrosion or changes are observed after 21 days exposure using the test method described in Comparison Examples 1 to 3.

What is claimed is:

1. A noncorrosive aqueous emulsion containing an organopolysiloxane and an emulsifier selected from the group consisting of a compound of the formula

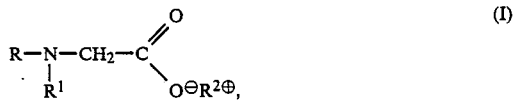

a compound of the formula

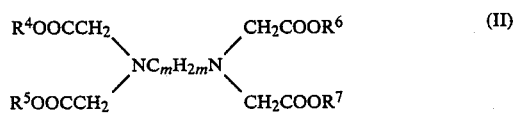

and mixtures of compounds (I) and (II), where R is selected from the group consisting of an aliphatically, saturated alkyl carbonyl radical of a carboxylic acid having from 5 to 30 carbon atoms, an aliphatically unsaturated alkyl carbonyl radical of a carboxylic acid having from 5 to 30 carbon atoms, a saturated alkylphenyl carbonyl radical and an unsaturated alkylphenyl carbonyl radical, where the alkyl group has from 2 to 20 carbon atoms, $R^1$ is selected from the group consisting of hydrogen and a methyl radical, $R^{2\oplus}$ is selected from the group consisting of an alkali metal cation and an ammonium ion of the formula

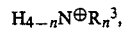

$R^3$ is selected from the group consisting of an hydroxylated alkyl radical having from 1 to 20 carbon atoms and a radical of the formula $-(C_yH_{2y}O)_xH$, where x is an integer of from 1 to 10, y is 2 or 3 and n is 0, 1, 2 or 3, $R^4$ is selected from the group consisting of an alkali metal and alkaline-earth metal cation, which forms a salt with the carboxyl group, $R^5$ is selected from the group consisting of an aliphatically saturated alkyl radical having from 5 to 30 carbon atoms, an aliphatically unsaturated alkyl radical having from 5 to 30 carbon atoms and an alkylphenyl radical, where the alkyl group has from 5 to 30 carbon atoms, $R^6$ and $R^7$ are each selected from the group consisting of an alkali metal cation, an alkaline-earth metal cation, which form a salt with the carboxyl group, an aliphatically saturated alkyl radical having from 5 to 30 carbon atoms, an aliphatically unsaturated alkyl radical having from 5 to 30 carbon atoms and an alkylphenyl radical, where the alkyl group has from 5 to 30 carbon atoms, and m is from 2 to 12.

* * * * *